G. F. FISHER.
TIRE AND METHOD OF MAKING SAME.
APPLICATION FILED JAN. 6, 1916.
1,271,880.
Patented July 9, 1918.
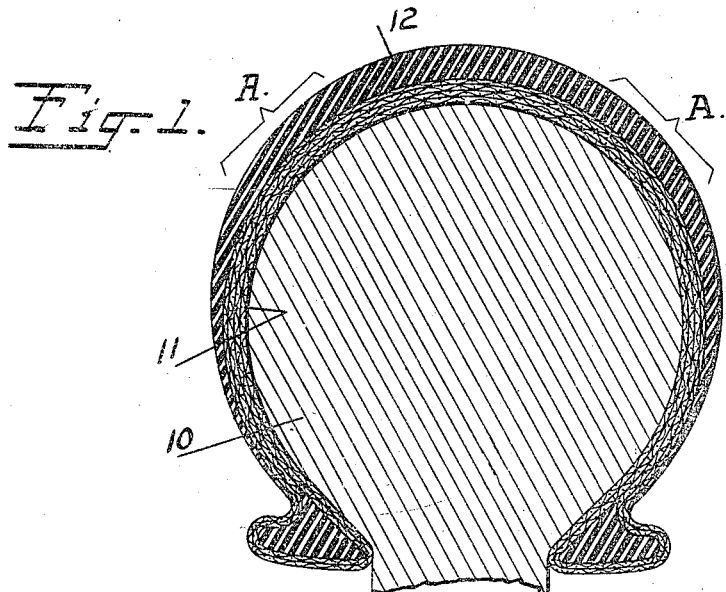
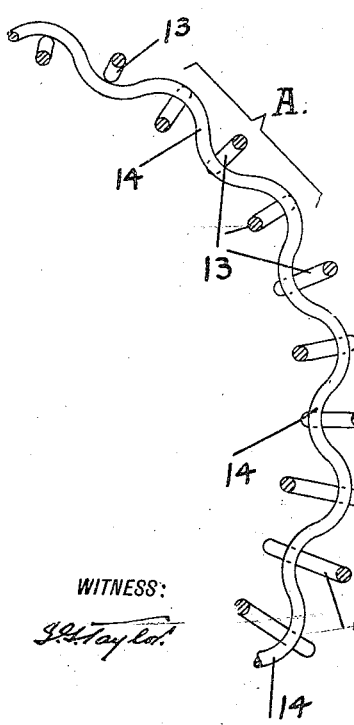
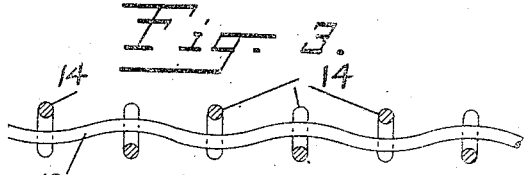
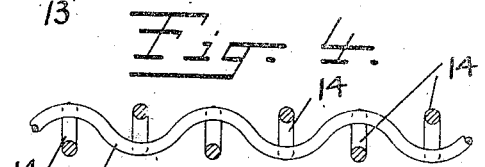
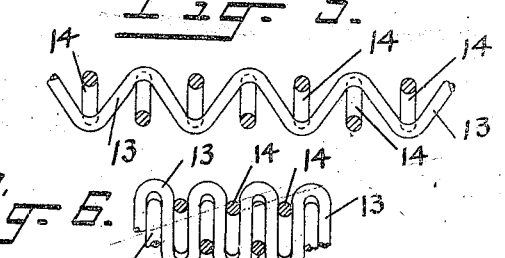
WITNESS:
INVENTOR
George F. Fisher,
BY
HIS ATTORNEY

UNITED STATES PATENT OFFICE.

GEORGE F. FISHER, OF ROSELLE, NEW JERSEY, ASSIGNOR TO THE HARTFORD RUBBER WORKS CO., A CORPORATION OF CONNECTICUT.

TIRE AND METHOD OF MAKING SAME.

1,271,880.  Specification of Letters Patent.  Patented July 9, 1918.

Application filed January 6, 1916. Serial No. 70,596.

*To all whom it may concern:*

Be it known that I, GEORGE F. FISHER, a citizen of the United States, residing at Roselle, county of Union, State of New Jersey, have invented a certain new and useful Improvement for Tires and Methods of Making Same, of which the following is a full, clear, and exact description.

This invention relates to tires of which the carcass is composed of plies of tire fabric on the straight, that is, in which the warp threads extend circumferentially of the tire, and the weft threads extend transversely from edge to edge of the tire.

The object of the invention is to provide an improved tire of this type, wherein at the critical zones, or those portions of the tire subjected to the severest strains, predetermined, desired conditions will exist in the warp and weft threads so that they coact equally and in unison to withstand strains.

The greatest flexing of a tire under load takes place throughout annular zones on opposite sides of the tire, which zones are known as the critical zones, and are to be found about one or two inches from the central plane of the tire, according to the size of the tire. The present invention provides a tire having warp and weft threads under equal tension throughout these critical zones, this end being attained by so manipulating the fabric that the warp threads will exhibit approximately the same crimp as the weft threads throughout the critical zones of the carcass.

The invention can be easily understood from the following description taken in connection with the accompanying drawing, in which—

Figure 1 is a cross-sectional view of a tire constructed in accordance with my invention.

Fig. 2 is a fragmentary cross-sectional view showing one ply of the fabric diagrammatically with the crimp exaggerated to better illustrate the invention.

Figs. 3 to 6, inclusive, are fragmentary longitudinal sectional views showing diagrammatically the variations in crimp of the threads at the tread, critical zones, and near the edges of the ply.

Referring now to the drawing, in which like characters of reference designate similar parts; 10 designates a tire forming ring core; 11 designates the carcass or strain resisting portion of a tire built upon the ring core, and 12 designates the rubber tread of the tire. The carcass of the tire is formed of convolutions of rubberized fabric on the straight, that is rubber treated fabric in which the warp and weft threads intersect at substantially right angles, the warp threads 13 extending circumferentially of the carcass and the weft threads 14 extending radially of the carcass from edge to edge.

In carrying out the invention each convolution of fabric is preferably laid on the ring core under such condition that the following characteristics will be exhibited by the product. There will be lesser crimp in the warp threads than in the weft threads at their intersections, throughout the tread of the carcass. Throughout the critical zones of the carcass, as indicated at A in Figs. 1 and 2, the crimp in the warp and weft threads at their intersections will be approximately the same. There will exist a greater crimp in the warp threads than in the weft threads below the critical zones, and by below, I mean, in the direction of the axis of rotation of the tire.

In one embodiment of the invention, I take rubber treated woven fabric on the straight, in which there exists greater crimp in the warp threads than in the weft threads throughout the width of the fabric, and supply this fabric in flat strip form under such tension to the revolving ring core that the strip will be stretched at its center longitudinally, and at the tread of the carcass a less crimp produced in the warp threads than that in the weft threads, (Fig. 3) while throughout the critical zones of the carcass the same crimp is produced in the warp threads as in the weft threads, (Fig. 4). The marginal portions of the strip are then shaped to the configuration of the side portions of the core, manually or mechanically, and in practice I have found that this may be done with extreme speed and accuracy by positively reciprocating presser fingers which move substantially tangentially upon the side portions of the fabric from near the tread to near the inner edge portions of the core, and press the weft threads together near the edge portion of the core with resultant increase in the crimp of the warp threads over that of the weft threads, (Figs. 5 and 6).

As a result of the peculiar magnitude of crimp in the warp relatively to the weft threads at different portions of the carcass, it has been found that longer life and greater durability is produced in the tire so constructed since by virtue of there being approximately equal crimp in the warp and weft threads at their intersections throughout the critical zones of the tire, substantially equal tension exists in the threads themselves throughout these zones, and consequently both sets of threads coact equally and in unison in resisting strains.

To complete the process, a tire formed as above described is vulcanized in any usual or preferred manner.

By constructing the tire as above described, it is possible to employ but a single strip applied continually upon the core in a plurality of convolutions to provide the required number of fabric plies. In this way the many splices of the ordinary tire composed of bias fabric are avoided, and the weaknesses arising therefrom are avoided.

Having thus described my invention, what I claim and desire to protect by Letters Patent is:

1. A tire comprising a plurality of convolutions of fabric having circumferentially extending warp threads and radially extending weft threads, the warp threads having less crimp than the weft threads at the tread portion of the tire, having approximately the same crimp as the weft threads at the zones of greatest flexing in the tire, and having greater crimp than the weft threads between said zones and the edges of the tire.

2. The process of producing tires of rubber treated fabric normally having greater crimp in the warp threads than in the weft threads, consisting of forming a plurality of convolutions of a continuous strip of the fabric under such tension that a less crimp is produced in the warp threads than exists in the weft threads at the tread of the convolutions and the same crimp is produced in the warp threads as exists in the weft threads throughout zones of greatest flexing in the convolutions, pressing the weft threads toward each other near the edge portions of the convolutions to produce greater crimp in the warp threads than in the weft threads, and vulcanizing the product.

3. A tire comprising a plurality of convolutions of fabric rubberized in strip form having circumferentially extending warp threads and radially extending weft threads, the fabric being stretched at certain points and compacted in other points so that the crimps at the intersections of the warp and weft threads are approximately the same throughout zones of greater flexing in the tire.

4. The process of building tires which comprises applying rubberized fabric in strip form to a core, the fabric having circumferentially extending warp threads and radially extending weft threads, preserving the crimping of the warp and weft threads approximately the same in zones laterally of the median plane of the tire and pressing the weft threads toward each other near the edges of the strips so that the crimping of the weft threads is less than the crimping of the warp threads.

Signed at New York, N. Y., this 30th day of December, 1915.

GEORGE F. FISHER.